C. S. FRISHMUTH.
COMPRESSION COCK.
APPLICATION FILED JULY 31, 1908.

941,316.  Patented Nov. 23, 1909.

Witnesses.
O. W. Edelin
Lillie M. Perry

Inventor
Charles S. Frishmuth
by Wm. H. Finckel
Atty

UNITED STATES PATENT OFFICE.

CHARLES S. FRISHMUTH, OF PHILADELPHIA, PENNSYLVANIA.

COMPRESSION-COCK.

941,316.             Specification of Letters Patent.      Patented Nov. 23, 1909.

Application filed July 31, 1908. Serial No. 446,275.

*To all whom it may concern:*

Be it known that I, CHARLES S. FRISHMUTH, a citizen of the United States, residing at Philadelphia, in the county of Philadelphia and State of Pennsylvania, have invented a certain new and useful Improvement in Compression-Cocks, of which the following is a full, clear, and exact description.

The object of this invention is to produce a compression cock which will drain the pipe on the outflow side, and in which the draining cannot begin until the cock is closed or so nearly closed as to reduce the inflow to a minimum.

The invention consists of a compression cock whose valve-disk is supported upon a stem having a quick-pitch screwthread working in a complementally screwthreaded cap, so that the valve-disk is very quickly seated and unseated. The stem is provided with a through-bore leading outside the shell or casing, and this stem is packed in the cap itself, without recourse to stuffing boxes and the like to render it leak-proof, and its bore is pierced transversely within the shell or casing and these inlet holes are so located with reference to the packing that in the act of unseating the valve-disk, they will be moved into the packing and be closed by it against the escape through the stem of fluid passing through the cock, and will be withdrawn from the packing by the seating of the valve-disk so as to permit the draining of the pipe beyond the cock. The main features of the invention are the stem with the quick-pitch screwthread, and the relative location and arrangement of the packing, so as to avoid the use of stuffing boxes and the draining inlets.

Figure 1:
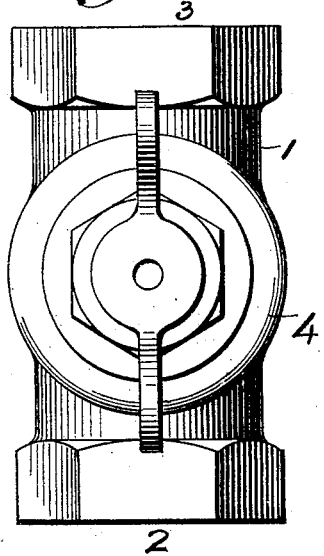
Figure 2:
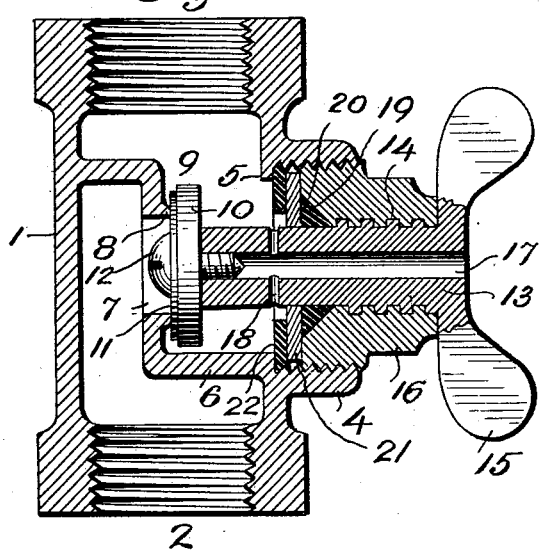
Figure 3:
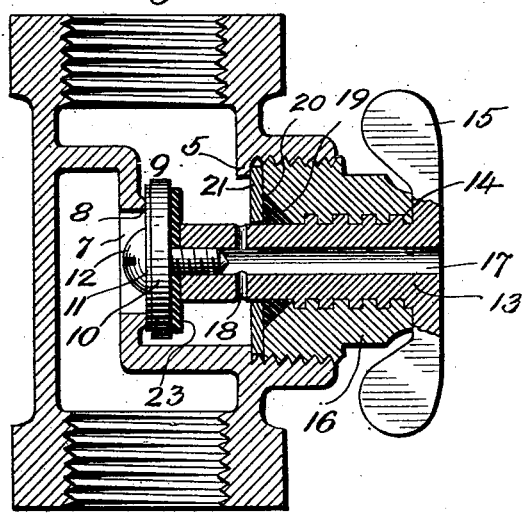

In the accompanying drawings, illustrating the invention, in the several figures of which like parts are similarly designated, Figure 1 is a front elevation. Fig. 2 is a longitudinal section. Fig. 3 is a longitudinal section of a modified construction.

The shell or casing 1 has the usual screw-threaded ends 2 and 3 for the pipes, and also has the internally screwthreaded projection 4, shoulder 5, and the diaphragm 6 having the waterway 7 and seat 8.

The valve-disk 9 may be of any usual or approved construction, and it is here shown as composed of a metal cap 10 with a washer 11 on its face next to the seat 8, and secured to the stem by a screw 12.

Referring to Figs. 1 and 2, the stem 13 is provided with a quick-pitch screwthread 14, an operating medium 15, preferably integral with it and of the wing variety, and it is mounted in a screw-cap 16 so as to have a rotary reciprocating motion therein to open and close the waterway 7. The stem is provided with a longitudinal through-bore 17, and this bore is intersected by transverse inlet openings 18 within the shell or casing, and of smaller diameter than the bore 17.

The cap 16 is recessed at 19, and this recess filled with packing 20 around the stem. Between the inner end of the cap and the shoulder 5 is a metal washer 21 closely fitting the stem, and between this washer and the shoulder is a fibrous or other non-metallic washer 22 which does not come into contact with the stem but does fit the valve-disk when the latter is moved up against it. The washer 21 serves to compress the packing 20 around the stem. The packing 20 and washers 21 and 22 also render the cap leak-tight both against escape of fluid around the stem and past the cap.

In the construction shown in Fig. 3, the fibrous washer 22 is omitted, but a fibrous washer 23 is placed upon the back of the valve-disk. The water or other fluid is supposed to enter at end 2, and as soon as the waterway is opened by raising the valve-disk, the fluid flows toward end 3. By a movement of the valve-disk sufficient to take it off its seat, the transverse inlets are brought within the washer 21 and closed, so that no fluid can escape through the stem's through-bore. This operation is possible by reason of the use of the quick-pitch screwthread on the stem. A reverse movement would run the transverse inlets beyond the washers into the shell but not until the valve-disk had been seated or practically so, and would then allow the fluid on outflow side of the cock to drain out through the through-bore of the stem. The operator, therefore, is not exposed to the escaping drainage.

In the construction shown in Fig. 1, the washer 22 would make a tight joint with the back of the valve-disk, and in the construction shown in Fig. 3, the washer 23 would serve the same purpose by coming into contact with the washer 21. After the valve-disk 9 is firmly screwed down on its seat, the inlets 18 fairly clear the metal washer 21, thereby permitting the waste to drain out through the channel or bore 17. This permits the cutting off of the supply of fluid by reducing the area of the flow through the waterway; and obviates that fault common in most compression cocks consisting in the inability to shut off the flow of fluid without wasting continuously during the period occupied in turning the stem to seat the valve-disk.

The ability to close quickly is due to the employment of the unusually coarse or quick-pitch screwthread on the stem, and it is of such quick pitch that a comparative touch upon the operating end of the device will move the stem sufficiently to place the transverse openings against the packing in the cap 16.

The inlets 18 are purposely made of very small diameter so that the device may be operated very quickly; and the portion of the stem through which these inlets are drilled is smooth and perfectly round, and, consequently, slides back and forth through the packing very readily and without the mouths of the inlets catching in the packing and becoming plugged up.

What I claim is:—

1. A quick-action compression cock, having a shell, a valve-seat therein, a valve-disk coöperating with said seat, a valve-stem having a quick-pitch screwthread, a cap having a complemental screwthread engaged by the threaded stem whereby said stem is capable of a rotary reciprocating motion in the shell and cap, said cap recessed at its inner end to receive packing, and a combined fibrous and metallic packing surrounding the valve-stem and interposed between the stem and cap and shell above the valve-disk, said valve-stem having a longitudinal bore opening outside of the valve shell and transverse inlets intersecting the longitudinal bore and arranged with relation to the packing so that upon unseating the valve-disk said transverse inlets will pass into the packing and be closed, and upon seating the valve-disk they will pass out of the packing and be opened to permit the drainage of the valve.

2. A quick-action compression cock, having a valve-seat, a valve-disk coöperating therewith, a valve-stem having a quick-pitch screwthread, a similarly screwthreaded cap in which said stem is mounted and is capable of a rotary reciprocating motion to open and close the valve and its drain ports quickly and in effect simultaneously, said stem perforated longitudinally and transversely so as to drain the valve, said cap recessed internally and provided with a packing surrounding the valve-stem, a metallic washer placed next to the cap and packing, and a fibrous washer arranged to coöperate with the metallic washer and valve-disk to make a tight joint with the back of the valve-disk when the valve is open.

3. A quick-action compression cock, having a valve-seat, a valve-disk coöperating therewith, a valve-stem having a quick-pitch screwthread, a similarly screwthreaded cap in which said stem is mounted and is capable of a rotary reciprocating motion to open and close the valve and its drain ports quickly and in effect simultaneously, said stem perforated longitudinally and transversely so as to drain the valve, said cap recessed internally and provided with a packing surrounding the valve-stem, a metallic washer placed next to the cap and packing and a fibrous washer placed next to the metallic washer and out of contact with the stem.

In testimony whereof I have hereunto set my hand this thirtieth day of July A. D. 1908.

CHARLES S. FRISHMUTH.

Witnesses:
JOSHUA R. MORGAN,
C. A. ELBERT.